(12) United States Patent
Witz et al.

(10) Patent No.: US 8,079,619 B2
(45) Date of Patent: Dec. 20, 2011

(54) HOSE END FITTING

(75) Inventors: Joel Aron Witz, Newdigate (GB); David Charles Cox, Thornton Heath (GB); Gerard Anthony Hall, Buckley (GB); Matthew Vernon Ridolfi, Houston, TX (US); Anthony James Wort, London (GB); Richard James Anthony Smith, Tarrant Hinton (GB)

(73) Assignee: BHP Billiton Petroleum Pty Limited (AU)

( * ) Notice: Subject to any disclaimer, the term of this patent is extended or adjusted under 35 U.S.C. 154(b) by 869 days.

(21) Appl. No.: 10/548,176

(22) PCT Filed: Mar. 5, 2004

(86) PCT No.: PCT/GB2004/000924
§ 371 (c)(1),
(2), (4) Date: Sep. 20, 2006

(87) PCT Pub. No.: WO2004/079248
PCT Pub. Date: Sep. 16, 2004

(65) Prior Publication Data
US 2007/0024051 A1    Feb. 1, 2007

(30) Foreign Application Priority Data
Mar. 5, 2003   (GB) .................................. 0305041.6

(51) Int. Cl.
*F16L 33/00* (2006.01)
(52) U.S. Cl. .................................... 285/249; 285/222.2
(58) Field of Classification Search .... 285/222.1–222.5, 285/238, 256, 249, 248; 138/127, 147
See application file for complete search history.

(56) References Cited

U.S. PATENT DOCUMENTS

| 956,076 A | 4/1910 | Greenfield |
| 1,178,559 A | 4/1916 | Vautier |
| 1,588,606 A | 6/1926 | Oden |

(Continued)

FOREIGN PATENT DOCUMENTS

DE    1 425 453    7/1969

(Continued)

OTHER PUBLICATIONS

Patent Application entitled, "Improvements Relating to Pipe", by Joel Aron Witz filed on Mar. 12, 2010 as U.S. Appl. No. 12/677,852.

(Continued)

*Primary Examiner* — Aaron Dunwoody
(74) *Attorney, Agent, or Firm* — Brinks Hofer Gilson & Lione; G. Peter Nichols (57) ABSTRACT

An end fitting (200) for terminating an end of a hose comprising a tubular body of flexible material arranged between inner and outer helical wires, characterized in that the end fitting comprises: an inner member (202) adapted to be disposed at least partially within the hose; and a hose engaging member (208) adapted to press against the inner member 202 to retain the hose between itself and the inner member (202). The end fitting also includes a separate means for retaining one or more layers of the hose, the retaining means comprising an outer retaining member (232) adapted to press against an inner retaining member (230) to retain the or each layer of the hose between the outer and inner retaining members (232, 230) of the retaining means.

14 Claims, 5 Drawing Sheets

U.S. PATENT DOCUMENTS

| | | | |
|---|---|---|---|
| 1,599,775 | A | 9/1926 | Lamb et al. |
| 1,607,909 | A | 11/1926 | Oden |
| 1,785,345 | A | 12/1930 | Hasemann |
| 1,810,032 | A | 6/1931 | Schulthess |
| 1,901,330 | A | 3/1933 | Poberejsky |
| 1,911,486 | A | 5/1933 | Bacheldor et al. |
| 2,011,781 | A | 8/1935 | Tabozzi |
| 2,184,984 | A | 12/1939 | Van Stone et al. |
| 2,220,785 | A * | 11/1940 | Goodall ............... 285/222.2 |
| 2,371,363 | A | 3/1945 | Smith |
| 2,610,869 | A * | 9/1952 | Allison ............... 285/222.5 |
| 2,661,026 | A | 12/1953 | Schulthess |
| 2,706,494 | A | 4/1955 | Morse |
| 2,825,364 | A * | 3/1958 | Cullen et al. ............ 285/222.4 |
| 2,829,671 | A | 4/1958 | Ernst et al. |
| 2,858,147 | A * | 10/1958 | Guarnaschelli ........... 285/222.5 |
| 2,940,778 | A | 6/1960 | Kaiser |
| 3,004,779 | A * | 10/1961 | Cullen et al. ............ 285/222.5 |
| 3,140,106 | A * | 7/1964 | Thomas et al. ............ 285/222.4 |
| 3,189,370 | A | 6/1965 | Marshail |
| 3,240,643 | A | 3/1966 | Schroeder et al. |
| 3,287,194 | A | 11/1966 | Waddell, Jr. |
| 3,318,620 | A * | 5/1967 | Cullen et al. ............ 285/222.5 |
| 3,333,325 | A * | 8/1967 | Goward ............... 29/508 |
| 3,380,764 | A * | 4/1968 | Wilson ............... 285/249 |
| 3,462,177 | A * | 8/1969 | Skinner et al. ............ 285/222.2 |
| 3,538,728 | A | 11/1970 | Tribey |
| 3,603,719 | A | 9/1971 | Lejeune |
| RE28,155 | E | 9/1974 | Dow et. |
| 3,856,052 | A | 12/1974 | Feucht |
| 3,919,026 | A | 11/1975 | Mizutani et al. |
| 4,033,612 | A * | 7/1977 | Chevalier ............... 285/222.4 |
| 4,063,757 | A * | 12/1977 | Fuhrmann ............... 285/222.1 |
| 4,123,088 | A * | 10/1978 | Tanaka ............... 285/14 |
| 4,323,089 | A | 4/1982 | Kadono et al. |
| 4,330,143 | A | 5/1982 | Reneau |
| 4,344,908 | A | 8/1982 | Smith et al. |
| 4,351,366 | A | 9/1982 | Angioletti |
| 4,377,186 | A | 3/1983 | Genini et al. |
| 4,411,845 | A | 10/1983 | Tanahashi |
| 4,422,993 | A | 12/1983 | Smith et al. |
| 4,430,383 | A | 2/1984 | Smith et al. |
| 4,436,689 | A | 3/1984 | Smith et al. |
| 4,445,543 | A | 5/1984 | Mead |
| 4,634,153 | A | 1/1987 | Kishton |
| 4,826,354 | A | 5/1989 | Adorian |
| 4,924,679 | A | 5/1990 | Brigham |
| 4,950,001 | A * | 8/1990 | Briggs ............... 285/222.1 |
| 5,182,147 | A | 1/1993 | Davis |
| 5,480,193 | A | 1/1996 | Echols et al. |
| 5,485,870 | A | 1/1996 | Kraik |
| 5,639,128 | A | 6/1997 | Belcher |
| 5,647,563 | A | 7/1997 | Gantner et al. |
| 5,685,576 | A | 11/1997 | Wolfe et al. |
| 5,698,278 | A | 12/1997 | Emond et al. |
| 5,860,682 | A | 1/1999 | Belcher |
| 5,893,681 | A | 4/1999 | Boden |
| 6,065,501 | A * | 5/2000 | Feret et al. ............... 138/134 |
| 6,110,550 | A | 8/2000 | Jarrin et al. |
| 6,334,466 | B1 | 1/2002 | Jani et al. |
| 6,379,596 | B1 * | 4/2002 | Warburton-Pitt ............ 264/139 |
| 6,659,510 | B1 | 12/2003 | Ikegami et al. |
| 6,874,542 | B2 * | 4/2005 | Mayau et al. ............... 138/109 |
| 6,923,477 | B2 | 8/2005 | Buon et al. |
| 7,243,686 | B2 | 7/2007 | Burke et al. |
| 7,712,792 | B2 | 5/2010 | Burke et al. |
| 7,735,524 | B2 | 6/2010 | Burke et al. |
| 7,743,792 | B2 | 6/2010 | Burke et al. |
| 2003/0178085 | A1 * | 9/2003 | Burke et al. ............... 138/138 |
| 2004/0066035 | A1 * | 4/2004 | Buon et al. ............... 285/222.2 |
| 2004/0112454 | A1 | 6/2004 | Takagi |
| 2004/0146676 | A1 | 7/2004 | Ikemoto |
| 2004/0256016 | A1 | 12/2004 | Arima et al. |
| 2009/0320951 | A1 | 12/2009 | Witz et al. |
| 2010/0059133 | A1 | 3/2010 | Witz et al. |
| 2010/0180976 | A1 | 7/2010 | Witz et al. |
| 2010/0183371 | A1 | 7/2010 | Witz et al. |
| 2010/0224277 | A1 | 9/2010 | Witz et al. |
| 2010/0229991 | A1 | 9/2010 | Witz et al. |
| 2010/0229992 | A1 | 9/2010 | Witz et al. |

FOREIGN PATENT DOCUMENTS

| | | |
|---|---|---|
| DE | 2 431 277 | 1/1975 |
| DE | 2 948 416 | 6/1981 |
| DE | 3 440 459 | 5/1986 |
| DE | 9 207 276 | 10/1992 |
| DE | 9 407 409 | 7/1994 |
| DE | 10 2005 046367 | 4/2006 |
| EP | 0 032 352 | 7/1981 |
| EP | 0 076 540 | 4/1983 |
| EP | 0 183 285 | 4/1986 |
| EP | 0 241 656 | 10/1987 |
| EP | 0 215 507 | 11/1989 |
| EP | 0 438 831 | 8/1995 |
| EP | 0 264 587 | 4/1998 |
| EP | 0 855 496 | 7/1998 |
| EP | 0 895 013 | 5/2000 |
| EP | 0 833 769 | 10/2001 |
| EP | 1 288 558 | 3/2003 |
| EP | 1 344 969 | 9/2003 |
| EP | 1 428 748 | 6/2004 |
| FR | 1499956 | 4/1966 |
| FR | 2194906 | 3/1974 |
| FR | 2235324 | 6/1974 |
| FR | 2753257 | 3/1998 |
| GB | 323352 | 1/1930 |
| GB | 550543 | 1/1943 |
| GB | 591307 | 8/1947 |
| GB | 591560 | 8/1947 |
| GB | 741643 | 12/1955 |
| GB | 849121 | 9/1960 |
| GB | 850131 | 9/1960 |
| GB | 895553 | 5/1962 |
| GB | 1019370 | 2/1966 |
| GB | 1034956 | 7/1966 |
| GB | 1312509 | 4/1973 |
| GB | 1383313 | 2/1974 |
| GB | 1477433 | 6/1977 |
| GB | 2070725 | 9/1981 |
| GB | 2104992 | 3/1983 |
| GB | 2104996 | 3/1983 |
| GB | 2107819 | 5/1983 |
| GB | 2186657 | 8/1987 |
| GB | 2223817 | 4/1990 |
| GB | 2289107 | 11/1995 |
| GB | 2303574 | 2/1997 |
| GB | 2312725 | 11/1997 |
| GB | 2339251 | 1/2000 |
| GB | 2363440 A * | 12/2001 |
| GB | 2366345 A * | 3/2002 |
| GB | 2408307 | 5/2005 |
| JP | 1283494 | 11/1989 |
| JP | 03-075132 | 3/1991 |
| JP | 08011138 | 1/1996 |
| JP | 08336845 | 12/1996 |
| JP | 11325333 | 11/1999 |
| SU | 396271 | 8/1973 |
| WO | WO 93/24731 | 12/1993 |
| WO | WO 96/36592 | 11/1996 |
| WO | WO 97/00805 | 1/1997 |
| WO | WO 01/96772 | 12/2001 |
| WO | WO 2004/044472 | 5/2004 |
| WO | WO 2004/079248 | 9/2004 |
| WO | WO 2005/119150 | 12/2005 |
| WO | WO 2006/044053 | 4/2006 |
| WO | WO 2007/129092 | 11/2007 |
| WO | WO 2009/034340 | 3/2009 |
| WO | WO 2009/034357 | 3/2009 |
| WO | WO 2009/034364 | 3/2009 |

OTHER PUBLICATIONS

Patent Application entitled, "Improvements Relating to Hose End Fittings", by Joel Aron Witz filed on Jun. 15, 2010 as U.S. Appl. No. 12/667,853.

Patent Application entitled, "Hose", by Joel Aron Witz filed on Jun. 10, 2010 as U.S. Appl. No. 12/667,854.

International Search Report and Written Opinion for PCT Application Serial No. PCT/GB2008/003098, dated Dec. 12, 2008, 6 pages.

International Preliminary Report on Patentability for PCT Application Serial No. PCT/GB2008/003098, dated Mar. 16, 2010, 5 pages.

International Search Report and Written Opinion for PCT Application Serial No. PCT/GB2008/003135, dated Dec. 12, 2008, 7 pages.

International Preliminary Report on Patentability for PCT Application Serial No. PCT/GB2008/003135, dated Mar. 16, 2010, 6 pages.

International Search Report and Written Opinion for PCT Application Serial No. PCT/GB2008/003121, dated Dec. 15, 2008, 10 pages.

International Preliminary Report on Patentability for PCT Application Serial No. PCT/GB2008/003121, dated Mar. 16, 2010, 7 pages.

International Preliminary Examination Report for PCT Application Serial No. PCT/GB01/02562, published on Dec. 20, 2001.

International Preliminary Report on Patentability for PCT Application Serial No. PCT/GB07/002446, dated Jan. 15, 2009.

International Preliminary Report on Patentability and Written Opinion for PCT Application Serial No. PCT/GB2007/003063, dated Feb. 26, 2009.

International Preliminary Report on Patentability and Written Opinion for PCT Application Serial No. PCT/GB2007/003058, dated Feb. 26, 2009.

Translation of Office Action for Chinese Patent Application Serial No. 2007800216292, dated Mar. 10, 2010, 9 pages.

Translation of Office Action for Chinese Patent Application Serial No. 2007800378028, dated Mar. 8, 2010, 8 pages.

Translation of Office Action for Chinese Patent Application Serial No. 2007800378136, dated Mar. 10, 2010, 6 pages.

Translation of Decision of Rejection for Chinese Patent Application Serial No. 2007800378136 dated Nov. 12, 2010, 8 pages.

* cited by examiner

HOSE END FITTING

This invention relates to hose, and more particularly relates to hose which can be used in cryogenic conditions. More specifically the invention relates to hose end fittings.

BACKGROUND OF THE INVENTION

Typical applications for hose involve the pumping of fluids from a fluid reservoir under pressure. Examples include supplying of domestic heating oil or LPG to a boiler; transporting produced oilfield liquids and/or gases from a fixed or floating production platform to the cargo hold of a ship, or from a ship cargo hold to a land-based storage unit; delivering of fuel to racing cars, especially during refuelling in formula 1; and conveying corrosive fluids, such as sulphuric acid.

It is well known to use hose for the transport of fluids, such as liquefied gases, at low temperature. Such hose is commonly used to transport liquefied gases such as liquefied natural gas (LNG) and liquefied propane gas (LPG).

In order for the hose to be sufficiently flexible, any given length must be at least partially constructed of flexible materials, i.e., non-rigid materials.

The structure of such hose generally comprises a tubular body of flexible material arranged between an inner and outer helically wound retaining wires. It is conventional for the two wires to be wound at the same pitch, but to have the windings displaced by half a pitch width from one another. The tubular body typically comprises inner and outer layers with an intermediate sealing layer. The inner and outer layers provide the structure with the strength to carry the fluid therein. Conventionally, the inner and outer layers of the tubular body comprise fabric layers formed of a polyester such as polyethylene terephthalate. The intermediate sealing layer provides a seal to prevent the fluid from penetrating the hose, and is typically a polymeric film.

The retaining wires are typically applied under tension around the inside and outside surfaces of the tubular body. The retaining wires act primarily to preserve the geometry of the tubular body. Furthermore, the outer wire may act to restrain excessive hoop deformation of the hose under high pressure. The inner and outerwires may also act to resist crushing of the hose.

A hose of this general type is described in European patent publication no. 0076540A1. The hose described in this specification includes an intermediate layer of biaxially oriented polypropylene, which is said to improve the ability of the hose to resist the fatigue caused by repeated flexing.

Another hose is described in GB-2223817A. The hose described in this publication is a composite hose comprising an inner helical metallic core, a plurality of layers of plastics material fibres and films wound on the core, at least one layer of glass cloth and at least one layer of aluminium foil disposed adjacent one another and wound onto the plastics material, and an outer helical metallic former. This hose is said to be suitable for transporting flammable fuels and oils.

Another hose is described in GB-1034956A.

SUMMARY

The invention is especially applicable to the hose described in WO01/96772. We have made some improvement to the end fitting of the hose described in this application. These improvements may be used with any combination of the features of the end fitting described in WO01/96772. They may also be used with any combination of the features of the end fitting described in WO01/96772.

The first feature relates to the hose engaging member. Thus, according to one aspect of the invention there is provided an end fitting for terminating an end of a hose comprising a tubular body of flexible material arranged between inner and outer gripping members, characterised in that the end fitting comprises: an inner member adapted to be disposed at least partially within the hose; and a hose engaging member adapted to press against the inner member to retain the hose between itself and the inner member, and a separate means for retaining one or more layers of the hose, the retaining means comprising an outer retaining member adapted to press against an inner retaining member to retain the or each layer of the hose between the outer and inner retaining members of the retaining means.

Preferably, the inner and outer retaining members are ring-shaped. More preferably the inner and outer retaining members are preferably provided in the form of a ring, preferably with the outer retaining member being disposed concentric with the inner retaining member. More preferably, the first and second members are split rings, to facilitate assembly.

In a preferred embodiment, the outer retaining member which comes into contact with the or each layer of the hose is provided with gripping formations to facilitate gripping of the or each layer of the hose. The surface of the inner retaining member may be provided with corresponding formations.

In a preferred embodiment, the adjacent surfaces of the inner and outer retaining members are provided with gripping formation to facilitate gripping of the or each layer of the hose therebetween.

There may be any convenient number of inner and outer retaining members. In the simplest embodiment, there is one outer retaining member and one inner retaining member. It is possible to provide two or more outer retaining members with one inner retaining member. It is possible to provide two or more inner retaining members with one outer retaining member. And it is possible to provide two or more outer retaining members with two or more inner retaining members, preferably so that each outer retaining member has a corresponding inner retaining member.

The hose engaging member is preferably ring-shaped. The hose engaging member is preferably in the form of a ring, more preferably a split ring. The hose engaging member preferably clamps all the layers of the hose securely between itself and the inner member of the end fitting.

In a preferred embodiment, the inner retaining member of the retaining means is integral with the hose engaging means. In this embodiment the hose engaging means comprises a first part of a first cross-sectional thickness (i.e. diameter, when ring-shaped), and the integral inner retaining member comprises a second part of a second cross-sectional thickness (i.e. diameter, when ring-shaped), the second thickness being less than the first thickness. The outer retaining member may have a third cross-sectional thickness (i.e. diameter, when ring-shaped), and the second and third cross-sectional thicknesses may be equal. Preferably, the sum of the second and third cross-sectional thicknesses is substantially the same as the first cross-sectional thickness.

When the inner retaining member is integral with the hose engaging member, it is preferable that the hose engaging member is L-shaped, so that the inner retaining member extends from the body of the hose engaging member, and the outer retaining member can be receiving in the recess of the L-shape.

When the inner retaining member is integral with the hose engaging member, the inner surface of the inner retaining member may also function to clamp the hose fixedly between the hose between itself and the inner member, i.e., it may contribute to the hose engaging function.

The second feature relates to the provision of a bend stiffener. The inner member used in the invention can in some circumstances cause a discontinuity in the bending stiffness at near the end of the hose making it prone to localisation of curvature, i.e. overbending, thereby disturbing the hose carcass formed by the helical wires of the hose.

In an embodiment, the load transmitting member comprises a cylindrical member having a first recess for receiving a part of the hose engaging member and a second recess for receiving part of the end member, whereby loads applied to the hose engaging member can be transferred to the end member via the cylindrical load transferring member.

Preferably, the bend stiffener is integral with the load transmitting member.

According to another aspect of the invention, the end fitting further includes an elongate tubular bend stiffener adapted to fit around the hose on the opposite side of the hose engaging member to the end member. The bend stiffener is preferably a polymeric material, most preferably polyurethane. Preferably the bend stiffener is tapered, such that the thickness decreases in a direction away from the end of the hose; the degree of the taper may be optimised for each particular application. Preferably the tip of the bend stiffener (i.e. the part furthest from the end of the hose) is provided with a shoulder against which any outer mechanical protection on the hose may be run. An example of such outer mechanical protection is described in our copending UK patent application number 0226271.5.

The third feature relates to the way the load transferring means is secured to the inner member. In WO01/96772 the end member of the load transferring means was shown bolted to the inner member. We discovered that while this arrangement was satisfactory, the fatigue resistance of the connection could be improved by making the end member an integral part of the inner member. Therefore, according to another aspect of the invention the end member of the load transferring means is integral with the inner member. The integral arrangement can be machined from a single forging or a block of welded components.

According to another aspect of the invention there is provided an end fitting for terminating an end of a hose comprising a tubular body of flexible material arranged between inner and outer gripping members, the end fitting comprising a load transferring means which includes a hose engaging member adapted to grip the hose, a load transmitting member, and an end member, the arrangement being such that the hose engaging member and the end member are connected through the load transmitting member, whereby loads applied to the hose engaging member can be transferred to the end member via the load transferring member, characterised in that the load transmitting member comprises a cylindrical member having a first recess for receiving a part of the hose engaging member and a second recess for receiving part of the end member.

The end member is preferably integral with the inner member.

The end fitting preferably also comprises an elongate tubular bend stiffener adapted to fit around the hose on the opposite side of the hose engaging member to the end member, wherein the bend stiffener is integral with the load transmitting member.

According to another aspect of the invention there is provided an end fitting for terminating an end of a hose comprising a tubular body of flexible material arranged between inner and outer helical wires, characterised in that the end fitting comprises: an inner member adapted to be disposed at least partially within the hose; and a hose engaging member comprising at a first member adapted to press against the inner member to retain the hose between the first member and the inner member, and a second member adapted to press against the first member to retain the hose between the second member and the first member.

According to another aspect of the invention there is provided a combination of a hose with an end fitting as described above.

The hose preferably comprises a tubular body and an axial reinforcing braid disposed between inner and outer gripping members, wherein the tubular body comprises inner and outer reinforcing layers and a sealing layer disposed between the inner and outer reinforcing layers.

The hose preferably further comprises a protective and/or insulative layer wrapped around said hose, wherein said protective and/or insulative layer has an end portion which is adapted to be received in the first recess of the cylindrical load transferred member.

Although more than one layer of the hose may be retained by the retaining means of the end fitting, it is particular preferred that the braid alone of the hose is retained between the inner and outer retaining members of the retaining means.

As mentioned above the hose and end fitting can be provide with any combination of the features of the hose and end fitting described in WO01/96772 and in UK patent application number 0226271.5.

The hose according to the invention can be provided for use in a wide variety of conditions, such as temperatures above 100° C., temperatures from 0° C. to 100° C. and temperatures below 0° C. With a suitable choice of material, the hose can be used at temperatures below −20° C., below −50° C. or even below −100° C. For example, for LNG transport, the hose may have to operate at temperatures down to −170° C., or even lower. Furthermore, it is also contemplated that the hose may be used to transport liquid oxygen (bp −183° C.) or liquid nitrogen (bp −196° C.), in which case the hose may need to operate at temperatures of −200° C. or lower.

The hose according to the invention can also be provided for use at a variety of different duties. Typically, the inner diameter of the hose would range from about 2 inches (51 mm) to about 24 inches (610 mm), more typically from about 4, 6 or 8 inches (203 mm) to about 16 inches (406 mm). In general, the operating pressure of the hose would be in the range from about 500 kPa gauge up to about 2000 kPa gauge, or even up to about 4000 kPa gauge, or higher. These pressures relate to the operating pressure of the hose, not the burst pressure (which must be several times greater). The volumetric flow rate depends upon the fluid medium, the pressure and the inner diameter. Flowrates from 1000 m$^3$/h up to 12000 m$^3$/h are typical.

The hose according to the invention can also be provided for use with corrosive fluids, such as strong acids.

BRIEF DESCRIPTION OF THE DRAWINGS

Reference is now made to the accompanying drawings in which.

DETAILED DESCRIPTION

Figure 1:
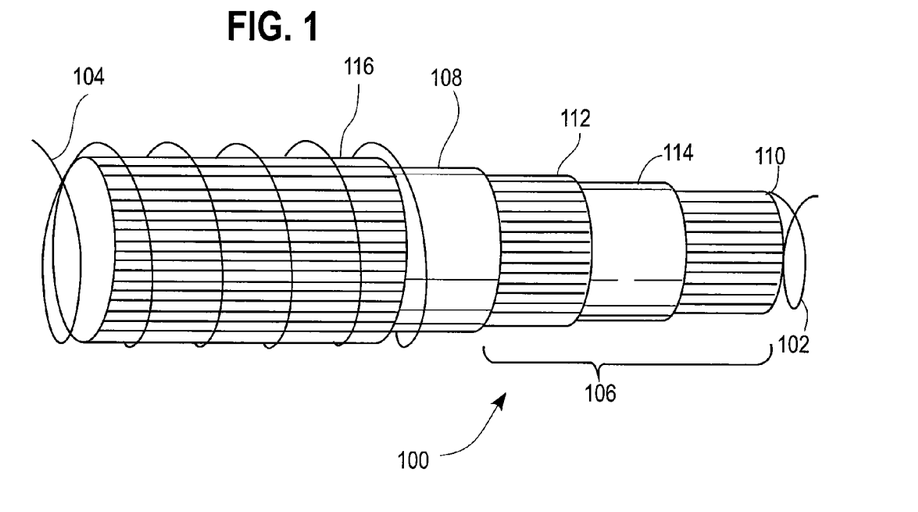
FIG. 1 is a perspective view of a hose with which the end fitting according to the invention may be used.

The type of hose to which this invention applies is described in detail in WO01/96772. FIG. 1 shows the hose 100 in more detail.

Briefly, the hose 100 comprises inner and outer gripping members 102, 104, which are preferably arranged in a helical form, and are preferably wires. Between the gripping members 102, 104 are arranged a tubular body 106 and an axial reinforcing braid 108, which surrounds the tubular body 106. The tubular body comprises an inner reinforcing layer 110, and outer reinforcing layer 112 and a sealing layer 114 arranged between the inner and outer reinforcing layers 110, 112. An outer protective/insulative layer 116 surrounds the braid 108. As mentioned above the hose 100 is described in greater detail in WO01/96772, the contents of which are incorporated herein by reference.

Figure 2:
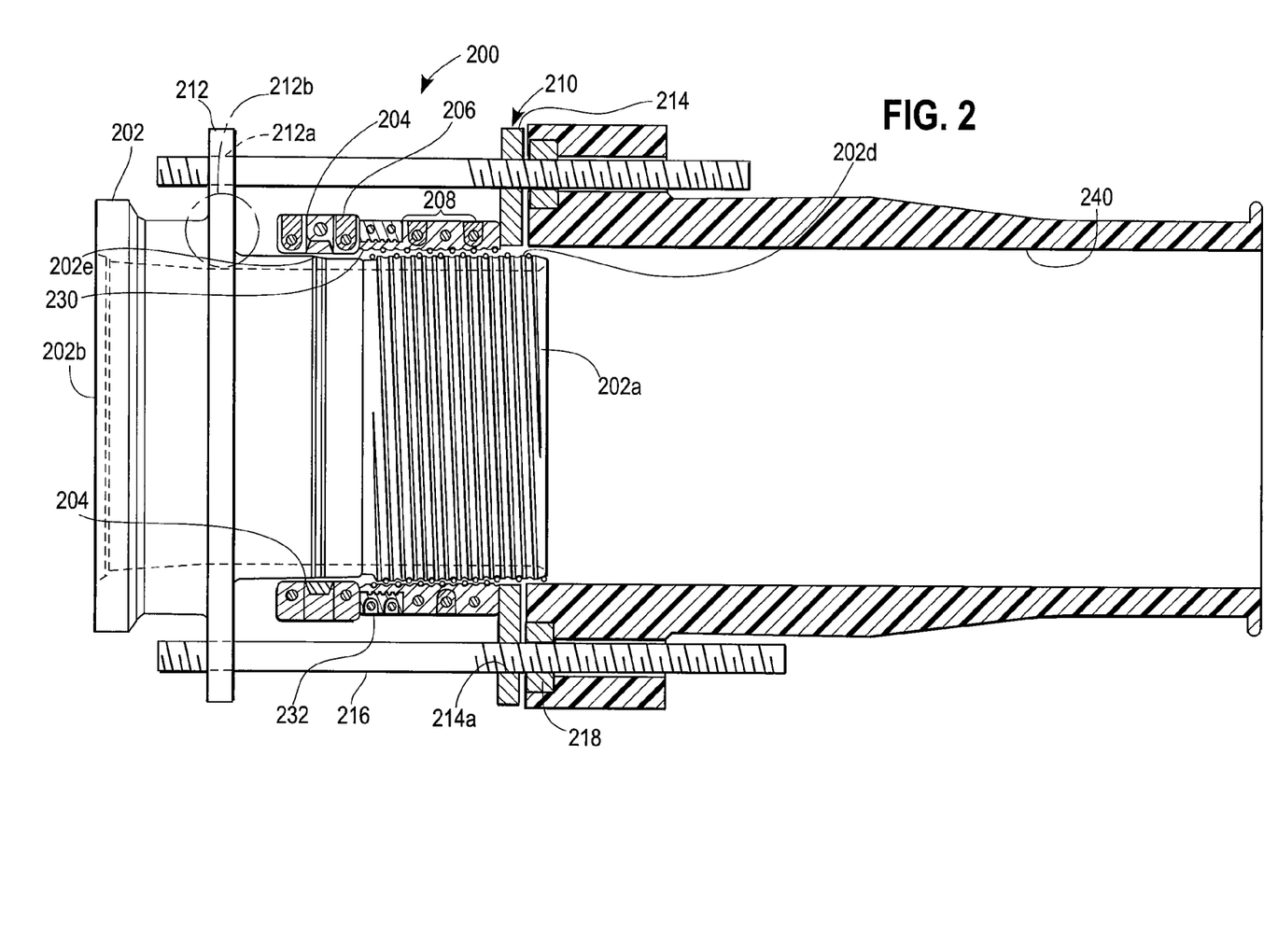
FIG. 2 is a schematic cross sectional view of a first embodiment of an end fitting for a hose, according to the invention.

The ends of the hose may be sealed using the end fitting 200 shown in the figure. The hose has not been shown in the figure, in order to improve the clarity. The end fitting 200 comprises a tubular inner member 202 having a hose end 202a and a tail end 202b. The end fitting 200 further includes a sealing member which comprises a sealing ring 204, which is typically based on a polymeric resin such as PTFE, and a stainless steel split ring 206 around the sealing ring 204.

The end fitting 200 further includes a load transferring means comprises a hose engaging member 208, a load transferring member 210 and an end member in the form of a disk-shaped plate 212. The plate 212 is integral with the tail end 202b of the inner member 202, as illustrated at 212b. The load transferring member comprises a disk-shaped plate 214 and at least one load transferring rod 216. In the figure there are two of the rods 216, but it is preferable to provide three or more of the rods 216, and it is preferable that the rods are equi-spaced around the circumference. A tightening nut 218 is provided on each rod 216. The plates 212 and 214 have apertures 212a and 214a respectively for receiving the rods 216.

The hose engaging member 208 is provided with an inner helical recess in the form of grooves 208a which are adapted to receive the outer wire of the hose therein. The inner member 202 is provided with an outer helical recess in the form of grooves 202d which are adapted to receive the inner wire therein. The grooves 208a and 202d are spaced by half a pitch length p, where p is the pitch length of the gripping wires of the hose (not shown).

The hose engaging member 208 also includes a retaining means for retaining the braid 108 of the hose 100. The retaining means comprises an inner retaining member 230 which is integral with the rest of the hose engaging member, and a separate outer retaining member 232. The outer 232 is capable of clamping the braid 108 of the hose 100 between itself and the inner member 230. The outer member 232 has gripping formations on the inner surface thereof to facilitate gripping the braid 108 between the outer member 232 and the inner member 230. The gripping formations are preferably circumferential but can take other patterns.

The member 202 is provided with two circumferential projections 202e which are located under the sealing ring 204. The projections 202e serve the improve the sealing of the tubular member between the inner member 202 and the sealing ring 204, and help to prevent the tubular member from inadvertently being pulled out of position.

The end fitting 200 is also provided with a polymeric bend stiffener 240 which has apertures 242 through which the rods 216 may be received. One end of the bend stiffener 240 abuts the plate 214.

Figure 3:
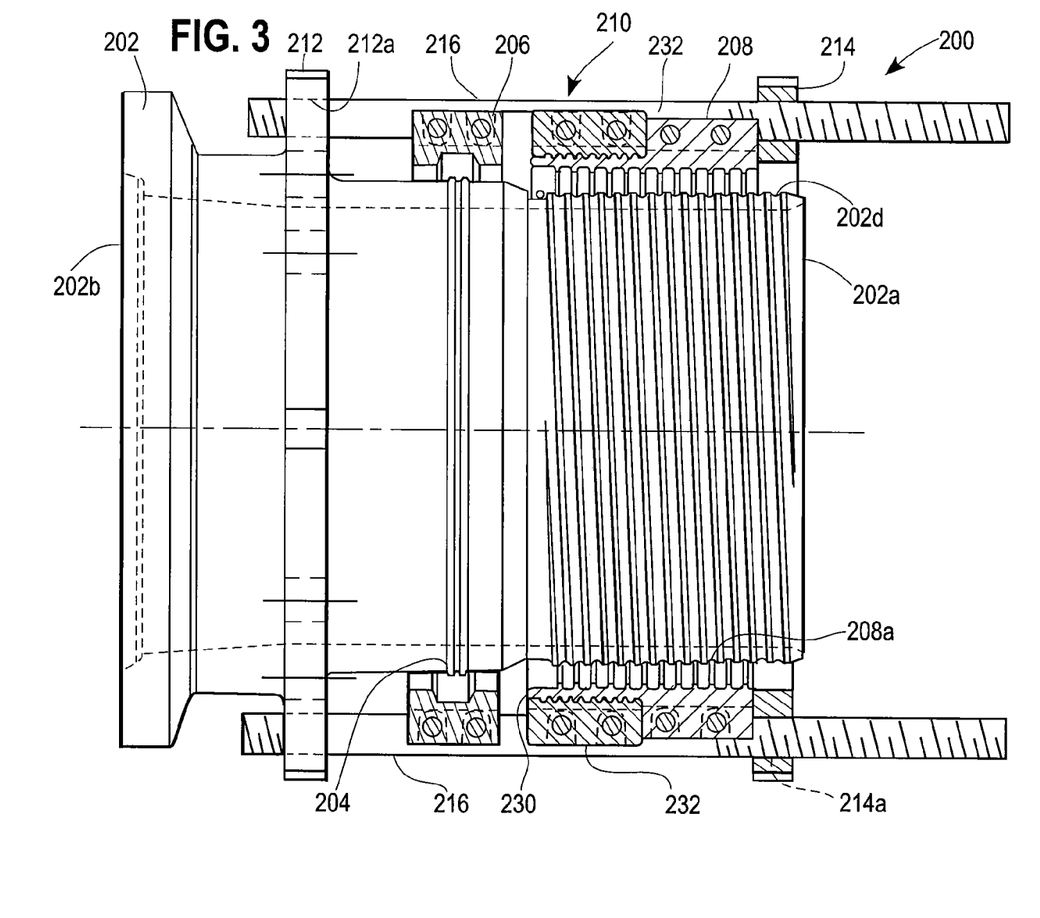
FIG. 3 is a schematic cross sectional view of a second embodiment of an end fitting for a hose, according to the invention.

FIG. 3 shows an end fitting which is similar to the end fitting shown in FIG. 2, and the same reference numerals have been used to designate the parts. The differences are: the bend stiffener is not provided in the design shown in FIG. 2, although it could be, if desired; the plates 212 and 214 have a smaller diameter, so that the structure is more compact.

Figure 4:
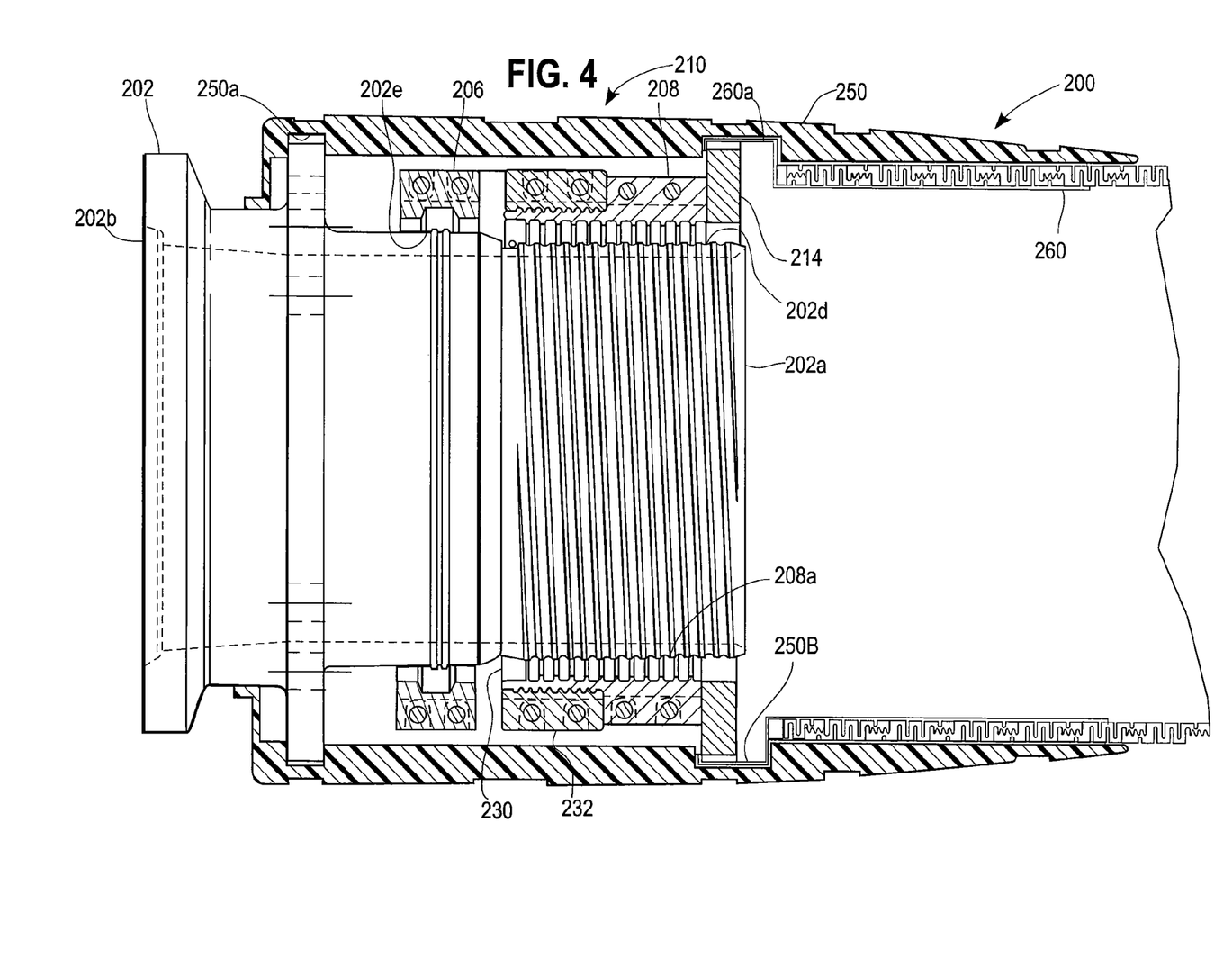
FIG. 4 is a schematic cross sectional view of a third embodiment of an end fitting for a hose, according to the invention.

FIG. 4 shows an end fitting which is similar to the end fitting shown in FIG. 2, and the same reference numerals have been used to designate the parts. In FIG. 4 the load transferring rod has been replaced by a load transferring member 250 which has recesses 250a and 250b adapted to receive the edges of plates 212 and 214 respectively.

The recess 250b also receives and end portion 260a of a protective and/or insulative layer 260 provided on the outer surface of the hose 100 (i.e. provided outside the gripping member 104. The layer 260 may be the same sort of layer as described in our copending international patent application number PCT/GB2003/004932. This comprises an elongate profiled member which is wrapped helically around the outside of the hose 100.

Figure 5:
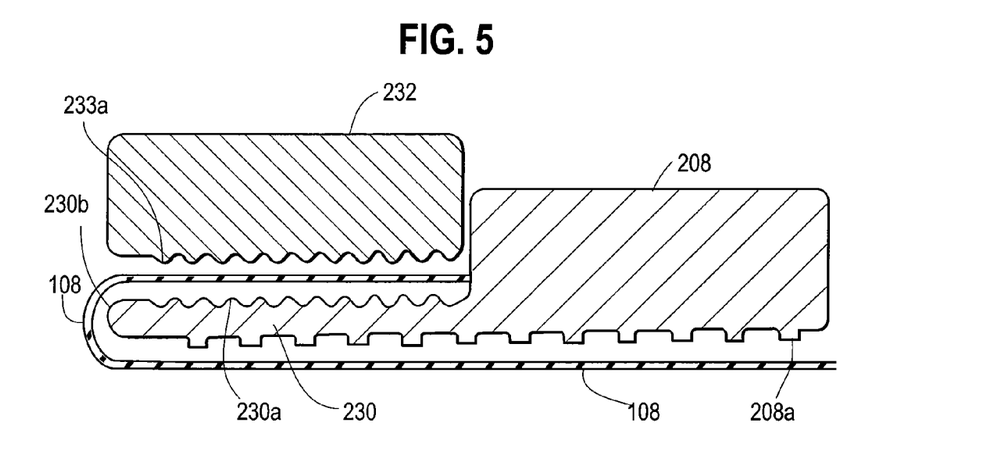
FIG. 5 is enlarged schematic cross sectional view of part of a hose engaging member of the end fitting according to the invention before assembly.
Figure 6:
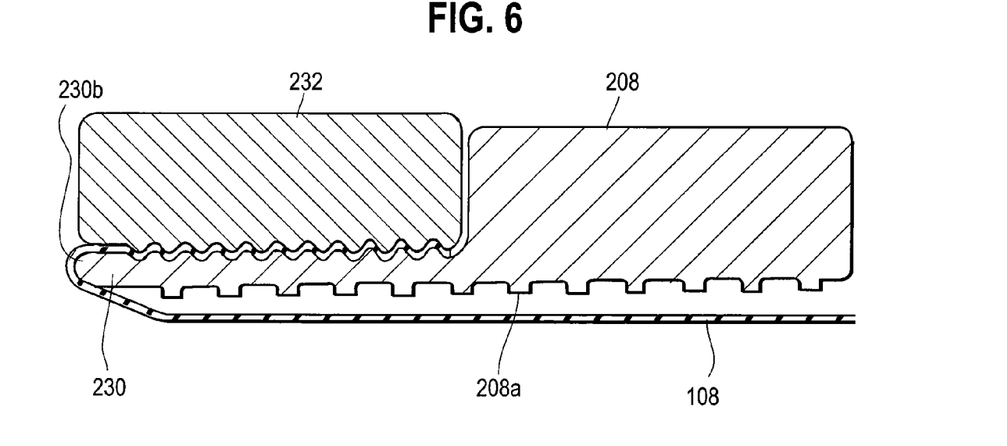
FIG. 6 is enlarged schematic cross sectional view of part of a hose engaging member of the end fitting according to the invention after assembly.

Reference is now made to FIGS. 5 & 6. For the axial reinforcing braid 108 to function most effectively, it should be securely anchored at the end fitting 200. The outer member 232 mates with the inner member 230 to provide this anchor. This interface is designed to reduce to zero the tension in the braid 108, caused by hose pressure and tension, in order to help prevent the braid 108 from being pulled from the anchor.

When the braid 108 is pulled axially it tries to reduce its radius, owing to the braid structure. If it is prevented from reducing its radius then a contact pressure is generated equal to the local tension times the local curvature. To illustrate the concept of local curvature, consider a string were wrapped around a cylinder, where the local curvature is the reciprocal of the cylinder radius. This contact force times the local friction coefficient anchors the braid 108 (this is the so called "capstan" effect). The frictional force is non-linear because of the undulating formations 230a and 232a on the members 230 and 232—it would be linear if it were straight plates. Non-linear decay is more effective.

The braid folds back out of the hose body around a filleted front edge 230b of the member 230. The filleted edge 230b prevents large stress concentrations being induced in the braid 108 as a result of the contact of the braid 108 with the member 232 under tension. This radius controls the contact pressure generated by the tension in the braid 108. The drop in tension is a non-linear function of the product of the angle of contact the braid makes with the radius and the local friction coefficient. In the case shown, where the radius of the fillet is constant, the non-linear function is exponential.

When the outer member 232 is fully mated against the inner member 230 the profiled surfaces 230a and 232a of the first and second members respectively mate closely thus forcing the braid 108 to pass through a series of undulations. Each undulation acts as a capstan and so reduces the tension in the braid as described earlier.

The hose is secured to the end fitting 200 as follows. The inner member 202 is threaded into the end of the hose, so that the hose lies close to the plate 212. The inner wire of the hose is received in the grooves 202d and the outer wire of the hose is received in the grooves 208a. The inner and outer wires are cut back so that they do not extend along the inner member 202 beyond the grooves 202d and 208a. Any insulation of the hose is also cut back to this point. The inner reinforcing layer of the hose is also cut back at this point, or at some point before it reaches the sealing ring 204. This means that the sealing layer of the hose directly engages the outer surface of the inner member 202. The rest of the tubular body of the hose is allowed to extend along the inner member 202 between the inner member 202 and the sealing ring 204.

The hose engaging member 208 is then tightened to cause it to clamp down on the hose bring it into firm engagement with the hose. The nuts 218 are then tightened, which induces some axial tension in the hose, thereby taking up any play in the system. These forces are transmitted from the hose engaging member 208, to the plate 214, to the rod 216, to the plate 212, and to the tail end 202b of the inner member 202. The tubular member is pulled back over the upper surface of the hose engaging member 208, and between the outer member 232 and the inner member 230. The second outer 232 and the inner member 230 clamp the braid 108 firmly in place.

The tubular body 106 of the hose 100 extends under the sealing ring 204. After the hose engaging member 208 and the nuts 218 have been tightened, the split ring 206 is tightened in order to increase the force applied on the tubular body by the sealing ring 204.

The end fitting 200 is then cooled to a low temperature by liquid nitrogen. This causes the sealing ring 204 to contract relatively more than the split ring 206, whereby the compressive force applied on the sealing ring 204 by the split ring 206 is reduced. While the split ring 206 and the sealing ring 204 are at a relatively low temperature, the split ring 206 is again tightened. The temperature is then allowed to rise to ambient conditions, whereby the compressive force on the sealing ring increases by virtue of the greater expansion of sealing ring 204 relative to the split ring 206.

It will be appreciated that the invention described above may be modified. For example, the inner retaining member 230 could be separate from the rest of the hose engaging member. Furthermore, additional inner and outer retaining members 230 and 232 may be provided.

The invention claimed is:

1. A hose comprising:
   a. a tubular body and an axial reinforcing braid disposed between inner and outer gripping members, wherein the tubular body comprises inner and outer reinforcing layers and a sealing layer disposed between the inner and outer reinforcing layers; and,
   b. an end fitting terminating an end of the hose, wherein the end fitting comprises:
      i. an inner member disposed at least partially within the hose; and
      ii. a hose engaging member having an inner and an outer surface, the inner surface of the hose engaging member pressing against the inner member to retain the hose between itself and the inner member, and a separate retainer comprising an outer retaining member pressing against an inner retaining member to retain one or more layers of the hose between the outer and inner retaining members of the retainer such that one or more retained layer of the hose extends between the inner member and the inner surface of the hose engaging member and extends around an end of the hose engaging member to the outer surface of the hose engaging member and to the retainer,
   wherein the adjacent surfaces of the inner and outer retaining members are provided with gripping formations which mate together to retain the or each retained layer of the hose between the inner and outer retaining members.

2. A hose according to claim 1, wherein the inner and outer retaining members are ring-shaped.

3. A hose according to claim 1, wherein two or more of the outer retaining members are provided.

4. A hose according to claim 1, wherein two or more of the inner retaining members are provided.

5. A hose according to claim 1, wherein the inner retaining member is integral with the hose engaging member.

6. A hose according to claim 1, further comprising an elongate tubular bend stiffener adapted to fit around the hose on the opposite side of hose engaging member to the end member.

7. A hose according to claim 6, wherein the end of the bend stiffener furthest from the end of the hose is provided with a shoulder against which any outer mechanical protection on the hose may be run.

8. A hose according to claim 6 further comprising a load transferring means which includes the hose engaging member and which further includes a load transmitting member, and an end member, the arrangement being such that the hose engaging member and the end member are connected through the load transmitting member, whereby loads applied to the hose engaging member can be transferred to the end member via the load transferring member.

9. A hose according to claim 8, wherein the bend stiffener is integral with the load transferring member.

10. A hose according to claim 1 further comprising a load transferring means which includes the hose engaging member and which further includes a load transferring member, and an end member, the arrangement being such that the hose engaging member and the end member are connected through the load transferring member, whereby loads applied to the hose engaging member can be transferred to the end member via the load transferring member.

11. A hose according to claim 10, wherein the end member is integral with the inner member.

12. A hose according to claim 10, wherein the load transferring member comprises a cylindrical member having a first recess for receiving a part of the hose engaging member and a second recess for receiving part of the end member, whereby loads applied to the hose engaging member can be transferred to the end member via the cylindrical load transferring member.

13. A hose according to claim 12, further comprising a protective or insulative layer wrapped around said hose, wherein said protective or insulative layer has an end portion which is adapted to be received in the first recess of the cylindrical load transferring member.

14. A hose according to claim 10, wherein the retainer is disposed between the hose engaging member and the end member.

* * * * *